United States Patent [19]

Ippolito et al.

[11] Patent Number: 4,932,572
[45] Date of Patent: Jun. 12, 1990

[54] SWIVEL GRAB BAR ASSEMBLY FOR A BICYCLE CHILD CARRIER

[75] Inventors: Robert Ippolito, Massapequa Park; Robert O'Donovan, Wantagh, both of N.Y.

[73] Assignee: Cycle Products Company, Commack, N.Y.

[21] Appl. No.: 339,262

[22] Filed: Apr. 17, 1989

[51] Int. Cl.⁵ .................................................. B62J 7/04
[52] U.S. Cl. ............................. 224/32 A; 224/33 R; 280/304.4; 280/748; 297/487
[58] Field of Search ................ 224/30 R, 32 R, 32 A, 224/33 R; 297/487, 488; 280/202, 304.4, 751, 753, 748, 749; 296/68.1; 272/34

[56] References Cited

U.S. PATENT DOCUMENTS

| | | | |
|---|---|---|---|
| 1,775,988 | 9/1930 | Custer | 280/748 X |
| 2,592,879 | 5/1952 | Eyerly | 280/748 X |
| 4,053,091 | 10/1977 | Martelet | 224/32 A |
| 4,655,506 | 4/1987 | Wise et al. | 297/488 X |
| 4,662,683 | 5/1987 | Knoedler et al. | 297/488 X |
| 4,770,468 | 9/1988 | Shubin | 297/488 X |

FOREIGN PATENT DOCUMENTS

| | | | |
|---|---|---|---|
| 264159 | 12/1964 | Australia | 280/748 |
| 550298 | 8/1956 | Belgium | 297/487 |
| 2132649 | 1/1972 | Fed. Rep. of Germany | 280/751 |

Primary Examiner—Henry J. Recla
Assistant Examiner—R. M. Fetsuga
Attorney, Agent, or Firm—Gottlieb, Rackman & Reisman

[57] ABSTRACT

A swivel grab bar assembly for a bicycle carrier is provided. The grab bar assembly is mounted on a bicycle child carrier forward of and above the child and includes a grab bar, an assembly for mounting the grab bar on the carrier, and a pivoting system which enables the grab bar to swivel or rotate from a first down position (in which a child may enter and exit the carrier) to a second upright position (so that the child is prevented from falling out the carrier).

7 Claims, 2 Drawing Sheets

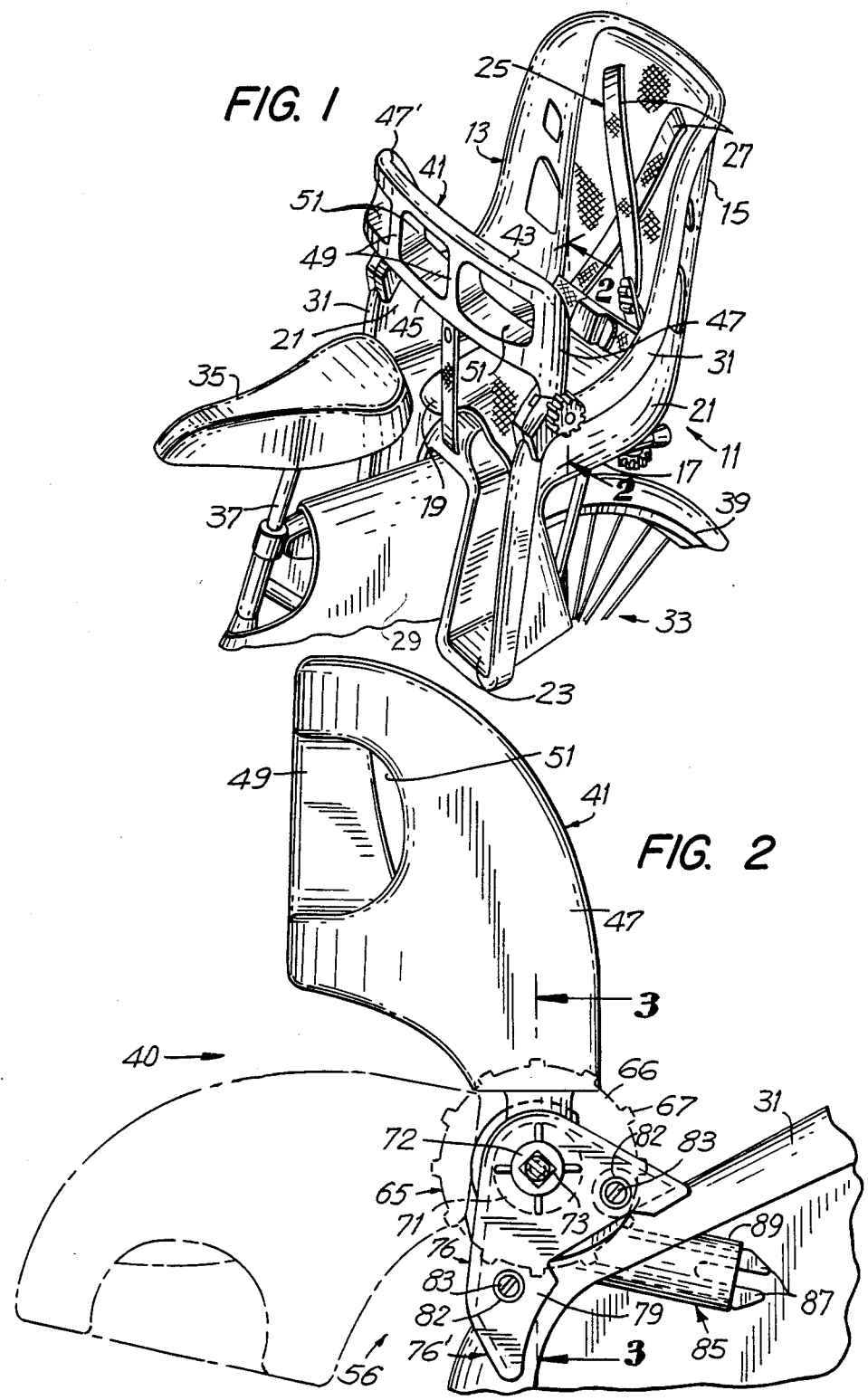

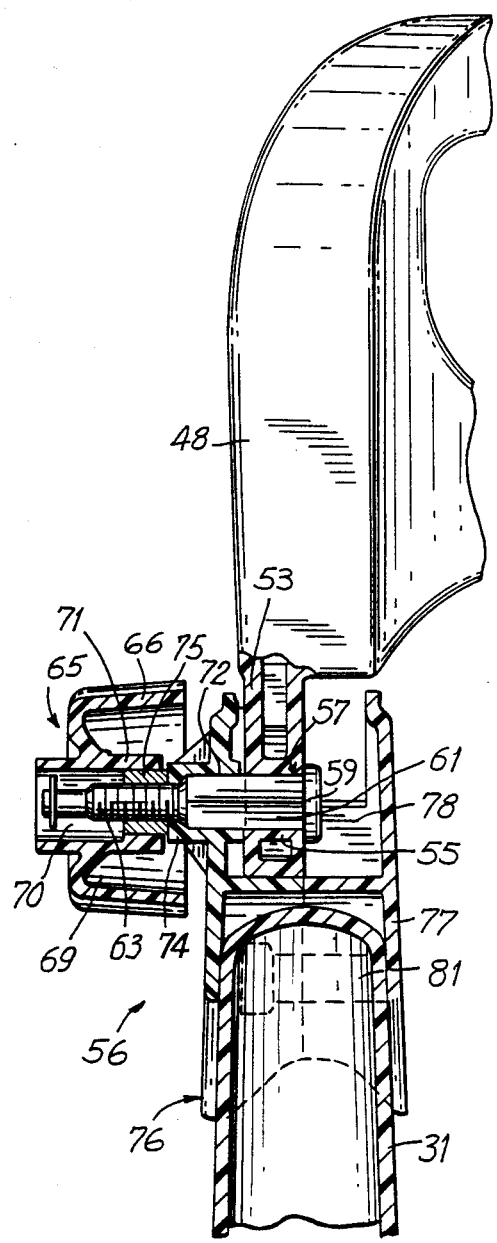
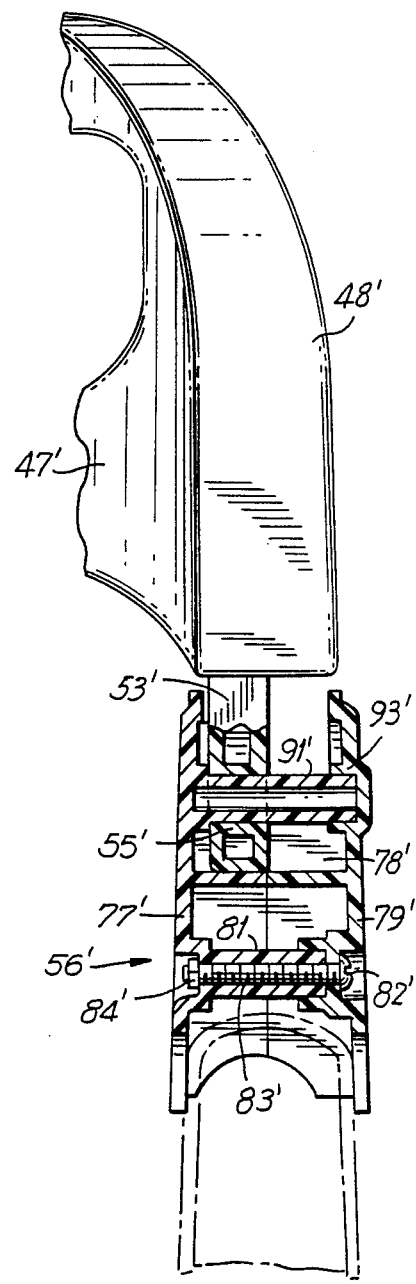
FIG. 3
FIG. 4

SWIVEL GRAB BAR ASSEMBLY FOR A BICYCLE CHILD CARRIER

BACKGROUND

This application relates to a swivel grab bar assembly for a bicycle carrier, and more particularly for a grab bar which may be adjustably mounted on a child carrier so that it can be moved from a first lower (open) position to a second upper (closed) position.

Carriers for bicycles and other transportation/recreational vehicles are well known in the art. A carrier for a bicycle is usually mounted on the frame of the bicycle behind the bicycle seat and above the rear wheel of the bicycle. Since the rider of the bicycle is not able to continuously observe the child being carried in the carrier, it would be desirable to provide a mechanism which helps prevent the child from falling out of the carrier.

Moreover, since a trip on a bicycle may be for a significant period of time, the child who is retained in the carrier may become bored and restless. The young child may also feel extremely insecure while being carried since he will be unable to grab onto a supporting element or member.

Accordingly, it would be desirable to provide an assembly which can be easily mounted onto a bicycle carrier which overcomes the disadvantages described above, and provides added safety for the carried child.

SUMMARY OF THE INVENTION

Generally speaking, in accordance with the invention, a swivel grab bar assembly for a bicycle carrier is provided. The grab bar assembly is mounted on a bicycle child carrier forward of and above the child and includes a grab bar, assemblies for mounting the grab bar on the carrier, and a pivoting system which enables the grab bar to swivel or rotate from a first down position (in which a child may enter and exit the carrier) to a second upright position (so that the child is prevented from exiting the carrier).

Each mounting assembly is coupled to one end of the grab bar and includes a plug member that may be selectively received along the corresponding sides of the carrier. The plug members promote easy attachment and detachment of the grab bar to the carrier.

The pivoting mechanism includes a knob member which may be tightened, in order to prevent the grab bar from rotating, and may also be loosened in order to enable rotation of the grab bar from a down position to an upright position, or vice versa.

Accordingly, it is an object of the present invention to provide a swivel grab bar assembly for a bicycle carrier.

Still another object of the invention is to provide a grab bar assembly whose position over the carrier may be adjusted from a first down position to a second upright position, or vice versa.

Still a further object of the invention is to provide a grab bar assembly which helps maintain the child seated in the carrier.

Still other objects and advantages of the invention will in part be obvious and will in part be apparent from the following description.

The invention accordingly comprises a product possessing the features, properties and the relation of components which would be exemplified in the product hereinafter described, and the scope of the invention will be indicated in the claims.

BRIEF DESCRIPTION OF THE DRAWINGS

For a fuller understanding of the invention, reference is made to the following description taken in connection with the accompanying drawings in which:

FIG. 1 is a perspective view of a swivel grab bar assembly made in accordance with the invention and shown mounted on a child carrier for a bicycle;

FIG. 2 is a cross-sectional view taken along line 2—2 of FIG. 1;

FIG. 3 is a cross-sectional view taken along line 3—3 of FIG. 2 and illustrates one of the mounting assemblies used to removably attach the swivel grab bar of the invention to the child carrier; and FIG. 4 is a cross-sectional view which corresponds to the view shown in FIG. 3, and illustrates the other mounting assembly used to removably attach the swivel grab bar of the invention to the child carrier.

DETAILED DESCRIPTION OF THE PREFERRED EMBODIMENT

Referring first to FIG. 1, a swivel grab bar assembly made in accordance with the invention and generally designated at 40 is illustrated. Grab bar assembly 40 is mounted on a bicycle carrier assembly 11 that includes a carrier generally indicated at 13 and a supporting assembly for attaching carrier 13 to a bicycle 33. Carrier 13 includes a back portion 15, a seat portion 17 on which a pad 19 is positioned, a pair of sides 21, a pair of leg wells 23 and a strap assembly 25 (which includes a pair of straps 27) for retaining a child in carrier 13. Bicycle 33, which includes a seat 35, a seat bar 37 and a rear wheel 39, is provided which a foot guard assembly 29 disposed between leg wells 23 of carrier 13 for preventing a child from injuring his or her legs by inadvertently swinging them inwardly towards wheel 39.

Turning now to FIG. 2 as well as FIG. 1, swivel grab bar assembly 40 made in accordance with the invention is shown mounted along running edges 31 (described in more detail below) formed along sides 21 of carrier 13. Swivel grab bar assembly 40 includes a swivel grab bar generally indicated at 41 and a pair of mounting assemblies 56 and 56' for removably coupling grab bar 41 to carrier 13.

Grab bar 41 comprises a top member 43, a base 45, a pair of end members 47 and 47' and a pair of arms 49 running between top member 43 and base 45. As shown in FIG. 1, arms 49 and end members 47 and 47' define three openings 51, each of substantially equal size. In use of grab bar assembly 40, a child retained in carrier 13 is able to wrap his or her hands around top member 43, which enables the child to feel more secure when seated in carrier 13.

Referring now to FIGS. 3 and 4 as well as to FIG. 2, end members 47 and 47, of grab bar 41 include back wall 48 and 48' and hook members 53 and 53' respectively, projecting downwardly from end members 47 and 47', as shown in FIGS. 3 and 4. Hook members 53 and 53' are used for attaching swivel grab bar 41 to mounting assemblies 56 and 56', as described hereinbelow.

Reference is now made to FIGS. 2 and 3, which illustrate mounting assembly 56 used for attaching one end (end member 47) of grab bar 41 to carrier 13. Mounting assembly 56 includes a casing assembly 76 and a knob assembly 65 retained thereby. Casing assembly 76 comprises an inner casing 77 coupled to an outer casing 79, as described below. Each of casings 77 and 79 have a substantially triangular configuration in cross-section and define a housing 78 therebetween at the apex thereof when casings 77 and 79 are coupled. Housing 78 receives hook member 53 when connecting end member 47 of grab bar 41 to mounting assembly 56.

In addition, mounting assembly 56 further defines a plug member 85 extending from therebelow, which is provided with a pair of flexible arms 87. Plug 85 may be selectively retained within an inwardly projecting tubular member 89 formed along running edge 31 of carrier 13 for attaching grab bar assembly 40 to carrier 13, as described in more detail below.

Mounting assembly 56 also includes a knob assembly 65, mentioned above, rotatably coupled to casing assembly 76 about an outwardly extending projection 74 of outer casing 79, as shown in FIG. 3. Knob assembly 65 includes a knob 66 having a number of ribs 67 formed along the outside annular surface thereof and an inwardly projecting member 71 that defines an annular groove 69 disposed between knob 66 and projecting member 71. Projecting member 71 is formed with a substantially tubular opening 73 having a forward threaded region 75 and a rearward non-threaded region 70, as shown in FIG. 3.

In order to assemble mounting assembly 56, it is necessary to attach knob assembly 65 to outer casing 79. Projection 74 of casing 79 is first positioned next to projecting member 71 extending from knob assembly 65 in order to align opening 73 running through projecting member 71 with an opening 72 running through projection 74. If alignment is proper, then a screw member 57 may be inserted through the aligned openings 72 and 73, as shown in FIG. 3. Screw member 57 includes a head 59, a shoulder 61 projecting from head 59 and a threaded screw 63 projecting from shoulder 61. Screw member 57 is inserted through aligned openings 73 and 72 by first inserting screw 63 through opening 72 of casing projection 74 and then screwing it within forward threaded region 75 of opening 73 in order to tighten knob assembly 65 about screw member 57. Tightening may continue until projecting member 71 abuts against shoulder 61 of screw member 57 (not shown).

After attaching knob assembly 65 to outer casing 79, it is then necessary to attach inner casing 77 to outer casing 79. Inner casing 77 is formed with a pair of substantially tubular screw housings 81 (one of which is shown in FIG. 3), each projecting inwardly from casing 77. Housings 81 are aligned with openings 82 (shown in FIG. 2) of outside casing 79 by having casings 77 and 79 face each other, as shown in FIG. 3. A screw member 83 is then inserted through each of openings 82 and corresponding aligned screw housings 81 so that the forward end of screw 83 projects slightly beyond screw housing 81. The end of screws 83 then receive a nut (not shown), which is tightened in a conventional manner in order to secure casing 79 to casing 77.

Prior to attaching the two casings, as discussed above, it is first necessary to position hook member 53 projecting from end member 47 of grab bar 41 over shoulder 61 of screw member 57, as shown in FIG. 3. Hook member 53 is formed with a slot 55 that rotatably receives shoulder 61. Once hook member 53 is positioned over shoulder 61, inner casing 77 is attached to outer casing 79, as discussed above, which prevents easy separation of hook member 53 from shoulder 61 of screw member 57. Nonetheless, hook member 53 can swivel about shoulder 61 at an angle of about 90 degrees, as discussed in greater detail below.

After rotably attaching mounting assembly 56 (which includes knob assembly 65) to one end of grab bar 41, as described above, it is now necessary to attach the other end of grab bar 41 to a second mounting assembly 56'. Mounting assembly 56', as shown in FIG. 4, includes an inner casing 77' and an outer casing 79', both of which are substantially similar in construction to casings 77 and 79 of mounting assembly 56. When casings 77' and 79' are attached, they define a plug (not shown in FIG. 4) projecting from below casing assembly 56' and including a pair of flexible arms. This plug is substantially the same as plug 85 projecting from casing assembly 76, as shown in FIG. 2.

Inner casing 77' includes a pair of screw housings 81' projecting inwardly thereof and a tubular member 91' also projecting inwardly thereof and through housing 78' defined by casings 77' and 79' at the apex thereof when casings 77' and 79' are attached.

In order to attach casing 77' and 79', it is necessary to first position hook member 53' projecting from end member 47' of grab bar 41 over tubular member 91' extending inwardly from casing 77'. Hook member 53 includes a hook member slot 55' that rotatably receives tubular member 91', as shown in FIG. 4.

Once hook member 53' is disposed over tubular member 91', casing 79' is positioned in face to face relationship with casing 77' such that the pair of screw housings 81' of casing 77' are aligned with openings 82' formed in casing 79' and tubular member 91 is received by an annular well 93' formed along the inside surface of casing 79' (see FIG. 4).

Once alignment is achieved as described above, and similar to the construction of mounting assembly 56, a pair of screws 83' are inserted through openings 82' in casing 79' and then through aligned screw housings 81', as shown in FIG. 4. Once screws 83' are inserted completely therethrough, a pair of nuts 84' are fitted and tightened over the forward ends of screws 83' in order to securely attach casing 77' to casing 79'.

Attention is now directed once again to FIGS. 1 and 2, in which the attachment of swivel grab bar assembly 40 to carrier 13 is shown. Carrier 13 includes a pair of corresponding running edges 31, as discussed above, each of which are formed with a tubular member 89 projecting from below and rearwardly of running edges 31. Each of tubular members 89 define an opening (not shown) in each of running edges 31 through which plugs 85 and 85' projecting from mounting assemblies 56 and 56' of swivel grab bar assembly 40 are received.

Since each of plugs 85 and 85' are formed with a pair of flexible arms 87 (not shown for plug 85'), one is able to matingly engage plugs 85 and 85' with tubular members 89. This is because flexible arms 87 are designed so that they may be compressed inwardly against the resisting force of arms 87 when inserting each of plugs 85 and 85' into tubular members 89. As a result, when insertion of plugs 85 and 85, into tubular members 89 is complete, arms 87 will press outwardly or towards the inside surface of tubular member 89, thereby resisting the removal of plugs 85 and 85' from tubular member 89.

In order to remove swivel grab bar assembly 40 from carrier 13, it is necessary to exert an upwardly directed lifting force on plugs 85 and 85' (by pulling upward on each end of grab bar 41) that is sufficient to overcome the force of arms 87 on the inner wall of tubular members 89. Once a sufficient force is generated, grab bar assembly 40 may be detached from carrier 13, and stored for later use.

Still referring to FIGS. 1 and 2, the operation of grab bar 41 of bar assembly 40 when bar assembly 40 is mounted on carrier 13 is now described. In order to position a child in carrier 13, it is first necessary to position grab bar 41 in a down position, as shown in phantom in FIG. 2. This is achieved by turning knob assembly 75 in a counter clockwise direction so that screw member 57 may be translated further into housing 78 defined by casing assembly 76. As a result, head 59 of screw member 57 and flange 58 disposed along the inner wall of casing 57 no longer press against hook member 53. This relief of pressure enables grab bar 41 to be rotated to a down position, allowing a child to be placed in carrier 13.

After the child is positioned in carrier 13 and strapped therein (by means of straps 27), grab bar 41 is now moved to an upper closed position since hook members 53 and 53' can rotate about shoulder 61 of screw member 57 and about tubular member 91, respectively. Once grab bar 41 is positioned appropriately (as shown in FIG. 2), it is now necessary to maintain grab bar 41 in an upper closed position. This is achieved by turning knob assembly 65 in a clockwise direction in order that head 59 of screw member 57 and flange 58 disposed along the inside surface of outer casing 79 exert a sufficient inward pressure against hook member 53 so that hook member 53 cannot turn about shoulder 61 of screw 57. Thus, grab bar 41 is locked in position for normal operation of grab bar assembly 40 when riding bicycle 33.

Once riding is completed, and it is necessary to remove the child from carrier 13, knob assembly 65 is again rotated in a counter clockwise direction in order to loosen the connection of grab bar 41 to mounting assembly 56. Grab bar 41 may then be moved to a down position so that access and removal of the child is possible.

Although a particular mechanism is shown for removably attaching grab bar assembly of the invention to a child carrier, any mechanism which achieves the same result as the mechanism disclosed may be used without deviating from the inventive concept.

It will thus be seen that the objects set forth above, among those made apparent from the preceding description, are efficiently attained, and since certain changes may be made in the above product without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:

1. For a child carrier for a bicycle or other vehicle, said carrier having a seat, a back and a pair of sides, a grab bar assembly mounted on said carrier forward of and above a child retained in said carrier, said grab bar assembly comprising:
   a grab bar having a first end and a second end;
   means for mounting the first end of said grab bar on the side of said carrier, said first end mounting means comprising a first casing assembly rotatably coupled to said first end of said grab bar and means for selectively connecting said casing assembly to said one side of said carrier, said first casing assembly including a first inner casing member and a first outer casing member connected thereto and defining a first housing therebetween;
   means for mounting the second end of said grab bar on the other side of said carrier, said second end mounting means comprising a second casing assembly rotatably coupled to said second end of said grab bar and means for selectively connecting said second casing assembly to the other side of said carrier, said second casing assembly including a second inner casing member and a second outer casing member connected thereto and defining a second housing therebetween;
   means for selectively enabling rotation of said grab bar from a first down position to a second upright position, wherein said rotation means comprising a screw assembly disposed in said first housing and selectively translatable along its own axis, means for selectively preventing translation of said screw assembly and fixed substantially tubular member disposed in said second housing;
   wherein said first end of said grab bar includes a first hook member pivotally receiving said screw assembly disposed in said first housing;
   wherein said second end of said grab bar includes a second hook member pivotally receiving said tubular member disposed in said second housing.

2. For a child carrier for a bicycle or other vehicle, said carrier having a seat, a back and a pair of sides, a grab bar assembly mounted onto the carrier forward of and above a child contained in the carrier, said grab bar assembly comprising:
   a grab bar having a first end and a second end;
   means for mounting the first end of said grab bar on one side of said carrier, said first end mounting means comprising a first casing assembly rotatably coupled to said first end of said grab bar and means for selectively connecting said casing assembly to said one side of said carrier, said one side connecting means comprising a first plug member receivable in a first tubular member projecting inwardly from said one side of said carrier, said first plug member including a pair of flexible arms which press outwardly against said first tubular member when said first plug member is retained therein;
   means for mounting the second end of said grab bar on the other side of said carrier, said second end mounting means comprising a second casing assembly rotatably coupled to said second end of said grab bar and means for selectively connecting said second casing assembly through said other side of said carrier, said other side connecting means comprising a second plug member receivable in a second tubular member projecting inwardly from said other side of said carrier, said second plug member including a second pair of tubular arms which press outwardly against said second tubular member when said second plug member is retained therein; and
   means for selectively enabling rotation of said grab bar from a first down position, whereby a child may enter and exit from said carrier, to a second upright position, whereby a child is retained in said carrier.

3. The grab bar assembly of claim 1, wherein said translation preventing means comprises a knob assembly screwingly coupled to said screw assembly.

4. The grab bar assembly of claim 3, wherein one of said first inner and first outer casings members includes an opening leading into said first housing which slidably receives said screw assembly.

5. The grab bar assembly of claim 4, wherein said screw assembly includes a head, a shoulder region having a width in cross-section less than said head and received within said hook member, and a screw portion extending from said shoulder region through said opening in one of said first inner and first outer casing members and screwingly attached to said knob assembly.

6. The grab bar assembly of claim 5, wherein said knob assembly includes an outer knob and an inner projecting member having an annular threaded region for screwingly receiving said screw portion of said screw assembly.

7. The grab bar assembly of claim 6, wherein:
said knob assembly is rotatable in a first direction in order to tighten said screw portion of said screw assembly in said annular threaded region, whereby said head of said screw assembly and one of said first inner and first outer casing members press inwardly against said hook member received over said shoulder, and said knob assembly is rotable in a second opposite direction in order to loosen said screw portion of said screw assembly in said annular threaded region, whereby said screw assembly head and one of said first inner and first outer casing members do not press inwardly against said hook member received over said shoulder.

* * * * *